United States Patent
Mach et al.

(10) Patent No.: US 7,197,291 B2
(45) Date of Patent: Mar. 27, 2007

(54) MULTIMODE RECEIVER AND METHOD FOR CONTROLLING SIGNAL INTERFERENCE

(75) Inventors: Richard Mach, Cary, IL (US); David Haub, San Diego, CA (US); Christopher Kurby, Elmhurst, IL (US); Louis Vannatta, Crystal Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 601 days.

(21) Appl. No.: 10/679,078

(22) Filed: Oct. 3, 2003

(65) Prior Publication Data

US 2005/0075077 A1 Apr. 7, 2005

(51) Int. Cl.
  *H04B 1/10* (2006.01)
(52) U.S. Cl. ............ 455/303; 455/283; 455/296; 375/148; 375/346
(58) Field of Classification Search .......... 455/303, 455/283, 296, 454, 452.2, 424, 425, 456.5, 455/456.6, 550.1, 575.1, 435.2, 448, 17, 455/500, 63.1, 65, 561, 67.11, 67.13, 552.1, 455/553.1, 134, 135, 136, 138, 143, 161.2, 455/161.3, 184.1, 232.1, 239.1–250.1, 277.1, 455/278.1, 280, 295, 302, 305; 375/144, 375/147, 346, 348, 146, 286, 316, 324, 345; 370/317, 328, 445, 338, 335, 342, 230, 252, 370/337, 347
See application file for complete search history.

(56) References Cited

U.S. PATENT DOCUMENTS

| | | | | |
|---|---|---|---|---|
| 4,739,518 A | * | 4/1988 | Bickley et al. | 455/296 |
| 4,907,293 A | * | 3/1990 | Ueno | 455/295 |
| 5,410,750 A | * | 4/1995 | Cantwell et al. | 455/306 |
| 6,175,587 B1 | * | 1/2001 | Madhow et al. | 375/148 |
| 6,795,488 B1 | * | 9/2004 | Iwakiri | 375/148 |
| 6,804,501 B1 | * | 10/2004 | Bradley et al. | 455/138 |
| 6,807,405 B1 | * | 10/2004 | Jagger et al. | 455/296 |
| 6,944,427 B2 | * | 9/2005 | Haub et al. | 455/63.1 |
| 6,961,552 B2 | * | 11/2005 | Darabi et al. | 455/241.1 |
| 2002/0070803 A1 | | 6/2002 | Rzyski | |
| 2002/0149535 A1 | | 10/2002 | Toncich | |
| 2002/0155812 A1 | * | 10/2002 | Takada | 455/63 |
| 2003/0045243 A1 | * | 3/2003 | Rauhala | 455/67.3 |
| 2003/0198306 A1 | * | 10/2003 | Forrester | 375/345 |
| 2004/0043733 A1 | * | 3/2004 | Marrah et al. | 455/138 |
| 2004/0062216 A1 | * | 4/2004 | Nicholls et al. | 370/320 |

FOREIGN PATENT DOCUMENTS

| | | |
|---|---|---|
| WO | WO99/45653 | 9/1999 |
| WO | WO00/18023 | 3/2000 |
| WO | WO01/74000 A1 | 10/2001 |
| WO | WO02/13402 A2 | 2/2002 |

\* cited by examiner

*Primary Examiner*—Edward F. Urban
*Assistant Examiner*—Charles Chow
(74) *Attorney, Agent, or Firm*—Vedder, Price, Kaufman & Kammholz, P.C.

(57) ABSTRACT

A multimode wireless receiver circuit (10) includes multi-receiver control and interference detection logic (50) and least two separate receivers: a first receiver (20) associated with a first radio access technology and a second receiver (30) associated with a second radio access technology. The multi-receiver control and interference detection logic (50) simultaneously controls the second receiver (30) to detect an interference blocker signal (100), while the first receiver (20) receives at least a portion of the wireless signal (80) and the interference product signal (90). In response to the second receiver (30) detecting the interference blocker signal (100), the multi-receiver control and interference detection logic (50) adjusts at least one operating condition of the first receiver (20) such that the interference product signal (90) received by the first receiver (20) is reduced.

26 Claims, 3 Drawing Sheets

MULTIMODE RECEIVER AND METHOD FOR CONTROLLING SIGNAL INTERFERENCE

FIELD OF THE INVENTION

The invention relates generally to wireless communication devices and methods and more particularly to a wireless device and method for mitigating interference.

BACKGROUND OF THE INVENTION

The recent emergence of second-generation, third-generation and higher wireless communication systems creates a need for wireless communication devices capable of accessing multiple communication systems with different radio access technologies within one or more wireless frequency bands. For example, the emergence of various communications standards has driven the need for wireless communication devices, such as wireless telephones, and other types of wireless devices, to be capable of accessing multiple communication systems employing different radio access technologies such as, for example, a global system for mobile communications (GSM) and wideband code division multiple access (W-CDMA) communication systems serving a common geographical area. The multimode wireless communication device may be, for example, a wireless phone, two-way radio, computer equipped with a wireless modem, wireless personal data assistants (PDAs), Internet compliance data terminal or any other suitable device. Having multimode capability allows a wireless device to operate with wireless communication systems having different modulation modes.

The full exploitation of the services of multiple communication systems using different radio access technologies in the same frequency band requires that the multimode wireless devices operate simultaneously on more than one communication system while tolerating interference caused by other transmitters on both systems without significant performance degradation. Since the bandwidth of each wireless frequency band, such as the United States 800 MHz and 1900 MHz wireless communication bands, and the 900 MHz and 1800 MHz wireless communication bands in Europe are fixed, as multiple modulation modes are permitted to transmit within the same frequency band, each multimode wireless transceiver and each base station must tolerate even greater levels of interference than if a single modulation mode in a frequency band is required. Further, as the number of multimode wireless devices communicating in a wireless communication system increases, system interference also generally increases. Interference is caused by other transmitters such as wireless devices and base stations transmitting on either the same frequency channel (co-channel), adjacent frequency channels, or any other frequency channel. As a result, new techniques are required in order to compensate for the interference caused by transmitters on a same or a different frequency with the same or different modulation modes.

For example, according to one embodiment, the multimode wireless transceiver has the capability to receive and transmit in two different modes such as in GSM and W-CDMA. This allows a user to move from one system to another, as long as the multimode wireless transceiver supports the standard for the system in operation. According to this example, both receivers in the multimode wireless transceiver may be required to contend with cross modulation interference caused in part by one of the transmitters within the multimode wireless transceiver transmitting a transmit signal, which is a well known interference phenomenon. Examples of the types of interference signals are second order intermodulation product signals, and third order intermodulation product signals including cross modulation. The second and third order interference product signal frequencies are related to the sum and difference products of the harmonics of two or more interference blocker signals generated in a device, such as in an amplifier or a receiver circuit, due to nonlinear characteristics inherent in the device. One set of second order interference product signals relate to the sum and difference products of at least two interference blocker signal frequencies, such as one signal frequency denoted by $F_1$, and a second signal frequency denoted by $F_2$, such that the sum product is $F_1+F_2$ and the difference product is denoted by $F_1-F_2$. Another set of second order interference product signals relate to simple square law detection of the envelope of a single interference signal at either F1 or F2 that may fall within the frequency band of interest. One set of third order harmonic interference product signal frequencies of importance are $(2 \cdot F_1-F_2)$ and $(2 \cdot F_2-F_1)$ that fall within the frequency band of interest. Another set of third order harmonic interference product signal frequencies of importance involve the crossmodulation of the transceiver transmitter spectrum onto an interference signal at either F1 or F2 such that the transmitter spectrum falls within the frequency band of interest.

According to one method in a single receiver wireless device, the linearity or spurious free dynamic range of a receiver stage such as a low noise amplifier (LNA) stage of the receiver, may be improved in order to reduce the generation of third order interference product signals as is known in the art. However, since only one receiver is used during normal operation, the single receiver wireless device cannot simultaneously receive a wireless signal and detect an interference blocking signal causing the generation of the interference product signal. Additionally, increasing the linearity or spurious free dynamic range of the LNA increases power consumption within the wireless device. Such a technique does not seek to reduce the generation of third order interference products within the receiver by other techniques that do not increase power consumption. Accordingly, such a method is limited to increasing the linearity or spurious free dynamic range of the low noise amplifier in a single receiver wireless device. This same reasoning can be applied to other devices in the receiver such as mixers, baseband amplifiers, baseband filters, and analog to digital converters.

According to another method, a multimode wireless transceiver includes two receivers to receive two wireless signals of different modulation modes in a non-concurrent method of operation. However, one receiver does not simultaneously receive a wireless signal while the other receiver detects a blocking interference source. Further, such a multimode wireless transceiver cannot operate simultaneously to receive a wireless signal while the second receiver detects the blocking interference source without causing a degradation of performance in one or the other receiver.

BRIEF DESCRIPTION OF THE DRAWINGS

The present invention is illustrated by way of example and not limitation in the accompanying figures, in which like reference numerals indicate similar elements, and in which.

DETAILED DESCRIPTION OF THE PREFERRED EMBODIMENT

Figure 1:
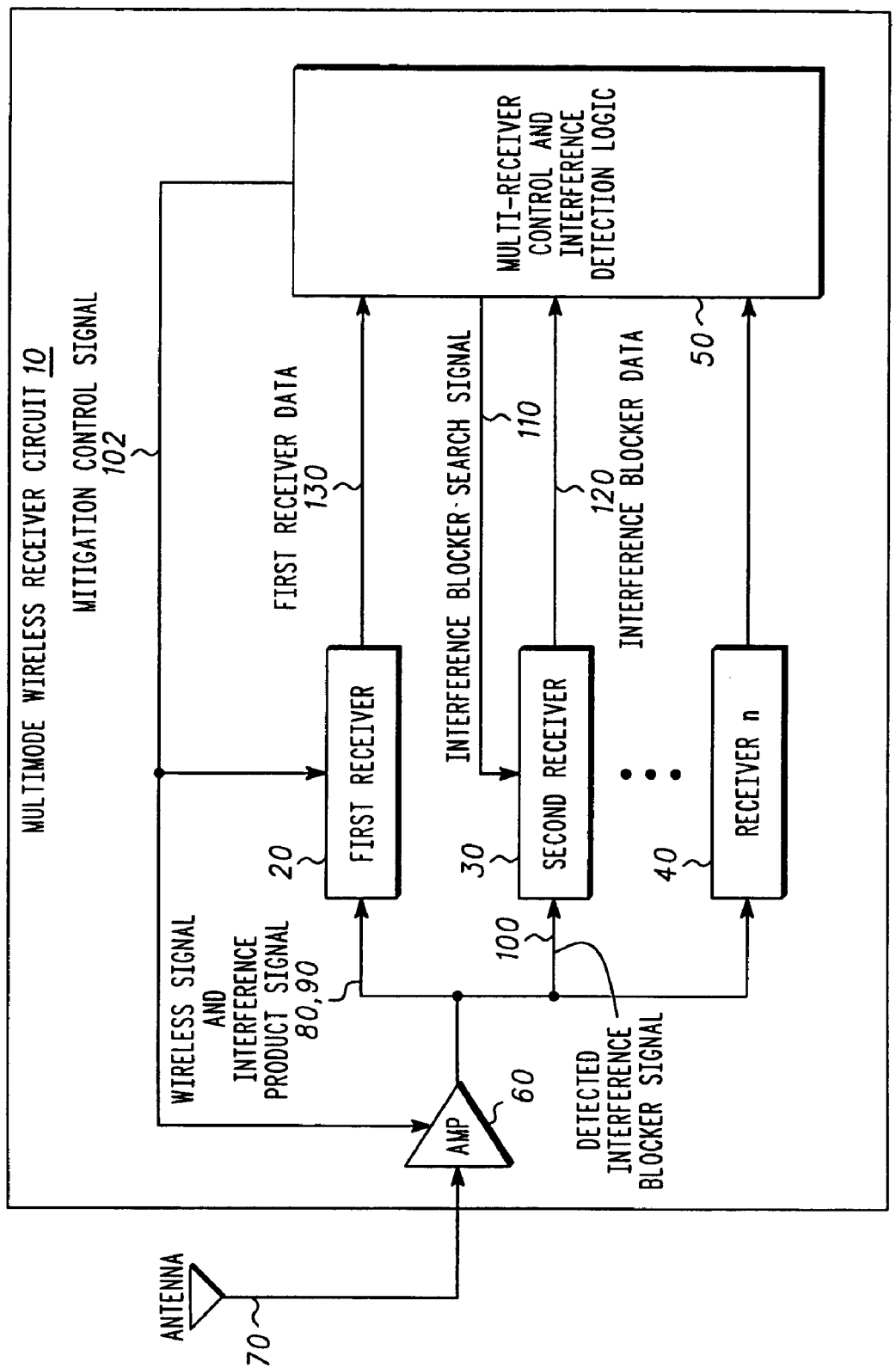
FIG. 1 is a block diagram illustrating one example of a receiver system according to one embodiment of the invention.

A multimode wireless receiver circuit includes multi-receiver control and interference detection logic and at least two separate receivers: a first receiver associated with a first radio access technology and a second receiver associated with a second radio access technology. The first and second radio access technologies may be, for example, W-CDMA and GSM technologies or any other suitable technologies. The multi-receiver control and interference detection logic simultaneously controls the second receiver to detect an interference blocker signal, while the first receiver receives at least a portion of a wireless signal and an interference product signal. For example, the multi-receiver control and interference detection logic may cause the second receiver to tune to a frequency, or scan a band of frequencies, in order to determine if an interference blocker signal exists. In response to the second receiver's detecting an interference blocker signal, the multi-receiver control and interference detection logic adjusts at least one operating condition of the first receiver such that the interference product signal received by the first receiver is reduced.

In a standard W-CDMA system, cross modulation typically involves only an adjacent channel W-CDMA signal and the transmit signal of the subscriber unit of interest. However, in a W-CDMA and GSM coband (sharing the same RF frequency band) multimode wireless device, the W-CDMA receiver will now be exposed to third order harmonic interference product signals, and other interference blocker signals caused by GSM transmissions as well as W-CDMA transmissions. Interference blocker signals are signals of any type other than the desired wireless signal. For example, interference blocker signals are emitted from other wireless devices and base stations. Returning to the example above, since the channel spacing in GSM is 200 KHz, and the channel spacing in W-CDMA is 5 MHz, a GSM interference blocker signal spaced 200 KHz away from a W-CDMA receiver will cause greater interference to a W-CDMA receiver than in a conventional W-CDMA system. Accordingly, when sufficient W-CDMA transmit power is present at the W-CDMA receiver, a cross mode cross-modulation interference spectrum will appear around any GSM interference blocker signals. As a result, the W-CDMA receiver is exposed to more interference in a coband W-CDMA and GSM system than in a conventional W-CDMA system. The increased interference results from, for example, the smaller frequency channel spacing, and from multiple interference contributions due to multiple GSM interference blocker signals. Moreover, a GSM transceiver may be receiving while the W-CDMA transceiver is transmitting. Again, if interference is present, a cross mode crossmodulation interference spectrum will appear around any GSM interference. As a result, the GSM transceiver is exposed to more interference in a co-band system than in a conventional GSM only system. Additionally, other known receiver spurs can also interfere with either the GSM or the W-CDMA receiver. Receiver spurs are also known to be caused by other locally generated signals such as intermediate frequency signals.

If the multi-receiver control and interference detection logic determines that the second receiver has detected an interference blocker signal, then the multi-receiver control and interference detection logic may adjust an operating condition of the first receiver, such as increasing the linearity of the first receiver or adjusting the filter characteristics of the first receiver. These techniques mitigate the effects of the interference blocker signal on the wireless signal received by the first receiver.

A method for reducing signal interference in a wireless receiver circuit includes receiving the wireless signal and the interference product signal by the first receiver. Simultaneously, the multi-receiver control and interference detection logic controls the second receiver by directing the second receiver to a frequency, or to scan a band of frequencies, in order to detect an interference blocker signal. Accordingly, the first receiver identifies the existence of an interference problem such as a degradation in the wireless signal caused by, for example, an interference product signal. The determination of an interference problem can be made based on a signal quality metric from the first receiver or measured interference powers and frequency offsets from the second receiver. Once the multi-receiver control and interference detection logic has determined the existence of an interference problem, the multi-receiver control and interference detection logic gathers information, such as the current frequency of transmission for the transmitter and reception of the first receiver and other status information.

The multi-receiver control and interference detection logic identifies the potential candidate interference blocker signals based on the status information previously gathered, such as the current receive and transmit channel and the adjacent channels for the frequency of any adjacent channels. Next, the multi-receiver control and interference detection logic may select a procedure to identify one or more interference blocker signals from the possible list of candidate interference blocker signals. The multi-receiver control and interference detection logic then causes the second receiver to tune to or search for interference blocking signals based on the candidate list of interference blocking signals. In response to the second receiver's detecting the interference blocker signal, the multi-receiver control and interference detection logic may adjust at least one operating condition of the first receiver in order to either reduce the interference product signal received by the first receiver or to increase the signal to interference ration of the first receiver.

Among other advantages, the present invention allows the wireless receiver circuit to adapt dynamically to the presence of an interference product signal causing a degradation in quality to the received wireless signal. This is accomplished by simultaneously receiving the wireless signal and the interference product signal while controlling the second receiver to detect the interference blocker signal. Additionally, the multimode wireless receiver circuit will allow the wireless device to receive and transmit in one mode while simultaneously receiving in another mode without causing a degradation of performance while communicating in either modulation mode.

The multimode wireless transceiver may be designed to transmit and receive radio frequency (RF) wireless signals of different modulation schemes depending on the communication systems' modulation scheme in operation in the user's geographical location. For example, modulation schemes for digital RF signals may include time division multiple access (TDMA) schemes, code division multiple access (CDMA) schemes, W-CDMA schemes, GSM based schemes, second generation wireless data technology schemes (2 G, including intermediate standards such as 2.5 G), third generation (3 G) wireless data technology schemes, multiple access schemes such as Enhanced Data Rates for Global Systems for Mobile Communications Evolution (EDGE), or other suitable technology schemes. The multimode wireless transceiver may provide multisystem interoperability in order to, for example, receive a call (i.e., a page) from systems with different types of modulation. Additionally, the multimode wireless transceiver may handover from one communication system using one modulation mode, to another communication system using another modulation mode. According to this example, while the multimode wireless transceiver is receiving and transmitting in one modulation mode, the multimode wireless transceiver may be receiving a signal in another modulation mode.

The multimode wireless transceiver may therefore fulfill a multimode role in order to overcome conflicting design requirements, such as transmitting and receiving a W-CDMA signal while simultaneously receiving a GSM signal in the presence of interferers. The multimode wireless transceiver may, therefore, employ the multimode wireless receiver circuit including the multi-receiver control and interference detection logic to dynamically identify the sources of interference and to adjust at least one operating condition of the first receiver in order to mitigate the effects of the detected interference blocker signal.

FIG. 1 illustrates a multimode wireless receiver circuit 10 in accordance with one embodiment of the present invention. The multimode wireless receiver circuit 10 includes a first receiver 20, a second receiver 30, and if desired, additional receivers designated as receiver n 40, where n is a whole number. The multimode wireless receiver circuit 10 also includes multi-receiver control and interference detection logic 50 and an amplifier 60, coupled to an antenna 70. The various elements of the multimode wireless receiver circuit 10 are linked by a plurality of links. The links may be any suitable mechanisms for conveying electrical signals or data as appropriate.

According to one embodiment, the amplifier 60 is coupled to the antenna 70, the first receiver 20, the second receiver 30 and the receiver n 40. The amplifier 60 provides the wireless signal 80 and the interference product signal 90 to the first receiver 20 and also provides the interference blocker signal 100 to the second receiver 30. Although the amplifier 60 is shown as providing the wireless signal 80 and the interference product signal 90 to the first receiver 20 and the interference blocker signal 100 to the second receiver 30, the amplifier 60 provides the wireless signal 80 and the interference product signal to the second receiver 30 as well, while the amplifier 60 also provides the interference blocker signal 100 to the first receiver 20. For example, the first receiver 20 may be tuned to one channel in order to receive the wireless signal 80 and the interference product signal 90 while the second receiver 30 simultaneously may be tuned to another channel in order to detect interference blocker signal 100. The wireless signal 80 may be a communication signal, such as a W-CDMA signal for providing communications to the multimode wireless communications device.

The multi-receiver control and interference detection logic 50 may be a microprocessor or any other suitable circuit for receiving information from and for controlling the first and second receivers. For example, a digital signal processor (DSP), discrete logic or any other suitable combination of hardware, software and firmware may be used to perform the functions of the multi-receiver control and interference detection logic 50. Further, multi-receiver control and interference detection logic 50 may be one or more suitably programmed processors such a microcontroller and therefore contains memory that contains executable instructions that when executed cause the multi-receiver control and interference detection logic 50 to carry out the operations described herein.

Also, although a common amplifier 60 is shown to feed both first receiver 20 and second receiver 30, separate amplifiers may be employed in order to be independently coupled to the first receiver 20 and the second receiver 30, respectively. Alternatively, amplifier 60 may be a part of first receiver 20 or a part of second receiver 30, or both, in a shared amplifier 60 configuration. Accordingly, amplifier 60 may be located in any suitable position within or outside of wireless receiver circuit 10. Furthermore, more components may be shared or independently coupled in this way, such as, for example, an RF filter.

The second receiver provides interference blocker data 120 to the multi-receiver control and interference detection logic 50 in response to the second receiver 30 detecting the interference blocker signal 100. The multi-receiver control and interference detection logic 50 provides the mitigation control signal 102 to the amplifier 60 and to the first receiver 20 to adjust at least one operating condition of the amplifier 60 and of the first receiver 20 in response to the second receiver 30 providing interference blocker data 120 to the multi-receiver control and interference logic 50.

Figure 2:
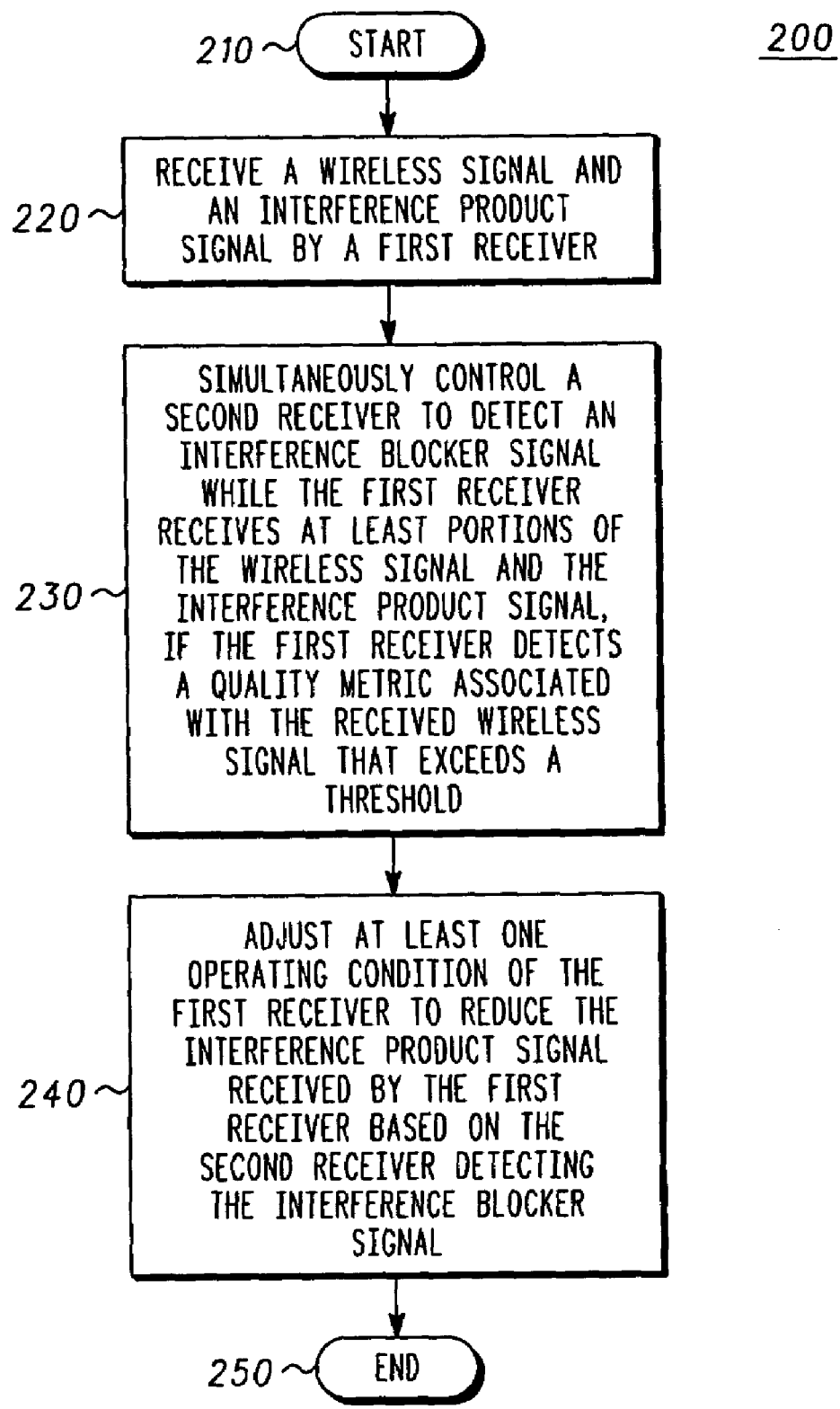
FIG. 2 is a flow chart illustrating one example of a method for reducing an interference level in a receiver system according to one embodiment of the invention.

FIG. 2 illustrates a method 200 for reducing signal interference in the multimode wireless receiver circuit 10 described with respect to FIG. 1 according to one embodiment of the invention. The method 200 may be carried out by the multimode wireless receiver circuit 10. However, any other suitable structure may also be used. It will be recognized that the method 200, beginning with Step 210, will be described as a series of operations, but the operations may be performed in any suitable order and may be repeated in any suitable combination.

As shown in Step 220, first receiver 20 receives the wireless signal 80 and the interference product signal 90. The multi-receiver control and interference detection logic 50 may determine that the wireless signal 80 is suffering from some quality impairment by receiving a signal quality metric via interference blocker data 120 from first receiver 20 associated with the wireless signal 80. If, for example, the signal quality metric, such as a bit error rate or a frame erasure rate, or any suitable quality metric, exceeds a threshold, then the multi-receiver control and interference detection logic 50 initiates a procedure to identify potential interference blockers as actual interference blocker signals 100 by directing the second receiver 30 to tune to a frequency or search a frequency band in order to detect the interference blocker signal 100. The quality metric associated with the received wireless signal may be, for example, a received quality indication (RXQUAL), that indicates, for example, a bit error rate, a frame error rate, or any suitable quality metric associated with the received wireless signal 80. The signal quality metric associated with the wireless signal 80 may also be an indication of channel energy over channel noise ($E_c/N_0$), a signal to noise ratio (SNR), a signal to interference ratio (SIR), and/or a received signal code power (RSCD). For example, the RSCD is analogous to a received signal strength indication (RSSI) in CDMA for a specific code, such as a Walsh code, as is known in the art. Accordingly, if the quality metric associated with the received wireless signal 80 exceeds the threshold, then the multi-receiver control and interference detection logic 50 will cause the second receiver 30 to search for and detect the interference blocker signal 100.

Once the multi-receiver control and interference detection logic 50 has identified the existence of a degradation in the wireless signal 80 such as, for example, by detecting that a quality metric associated with the wireless signal 80 exceeds a predetermined threshold, then the multi-receiver control and interference detection logic 50 gathers information regarding the current status of the multimode wireless receiver circuit 10 in order to select a procedure for identifying the interference blocker signal 100. For example, the current status of the multimode wireless transceiver such as the current transmit and receive frequency may be stored in a register accessed by the multi-receiver control and interference detection logic 50. At this point, since the multi-receiver control and interference detection logic 50 has detected some type of degradation in wireless signal 80, the degradation in wireless signal 80 may be due to, for example, a first, second or third-order or some other type of harmonic interference product signal. The cause of the degradation in the wireless signal 80 may also be a combination of the above possibilities.

As previously stated, the interference block signal 100 may be a first-order harmonic, a second-order harmonic, a third-order harmonic or any order harmonic of the interference blocker signal 100. For example, the interference blocker signal 100 may mix with another interference blocker signal within, for example, the first receiver 20 due to, for example, nonlinearities inherent in first receiver 20 to produce the interference product signal 90. Accordingly, the interference blocker signals are the cause of the generation of interference within the first receiver 20 and manifest themselves as the interference product signal 90 generated in the first receiver 20. The interference product signal 90 has a same or similarly close frequency as the received wireless signal 80 and as a result affects the quality of the received wireless signal 80.

As previously described, the narrower 200 kHz channel spacing of GSM signals relative to the 5 MHz channel spacing in W-CDMA causes greater interference to a W-CDMA receiver than in a conventional W-CDMA system. For example, the greater interference may be caused by the presence of interference blocker signals that are spaced together much more closely than are W-CDMA transmitters, which are spaced at 5 MHz apart. Accordingly, the multi-receiver control and interference detection logic 50 may produce a candidate list of potential interference blocker signals based on, for example, the current transmit power level, the determination of whether the transmitter is currently on or off, a transmit and receive channel assignment, a received signal strength level of the wireless signal 80, a quality level associated with the wireless signal 80, a received signal strength level of the interference blocker signal 100, a bandwidth of the operating channel, such as the W-CDMA operating channel, a channel spacing, such as 5 MHz for W-CDMA and 200 kHz for GSM, a list of internal receiver harmonic interference signals (i.e. receiver spurs as is known in the art), a receiver selectivity and a receiver sensitivity. For example, the list of internal receiver harmonic interference signals may be determined based on the generation of third order harmonic interference signals caused by the mixing of internally generated signals, such as, for example, intermediate frequency (IF) signals used for up-converting or down-converting signals, as is known in the art. As another example, if the bandwidth of a filter is set at a relatively wide bandwidth, then the possible source of interference may include, for example, co-channel interference as well as third order harmonic interference.

As previously described, the presence of a W-CDMA transmit signal and the presence of a GSM transmit signal may combine in amplifier 60 in order to produce an interference product signal in accordance with a third order harmonic generated as a result of non-linearities inherent in amplifier 60. As previously discussed, the relationship between the blocker signals and the resulting interference product signals may be expressed as $(2 \cdot F_1 - F_2)$ and $(2 \cdot F_2 - F_1)$ or by crossmodulation onto the interference at F1 or F2. Accordingly, the multi-receiver control and interference detection logic 50 may predict the potential frequency of any GSM transmitters based on a predetermined frequency plan. Based on this knowledge, the multi-receiver control and interference detection logic 50 may produce a candidate list of possible interference blocker signals based on the knowledge of the frequency associated with these known signals, such as GSM transmit signals.

Other current operating information regarding the receiver may also be utilized to determine the possible sources of interference such as the level of automatic gain control as is well known in the art. As yet another example of using the status of the wireless receiver circuit 10 and the transmitter to determine the possible sources of interference, the multi-receiver control and interference detection logic 50 may detect that the transmitter is off or is at a low power level. As such, interference due to cross modulation generated in the amplifier 60 or first receiver 20 is not possible and, therefore, other sources of third order harmonic interference may be explored.

The multi-receiver control and interference detection logic 50 identifies a potential list of interference blocker signals and selects a test procedure to make measurements for producing the confirmed or actual interference blocker signals based on the measurement results of the candidate interference blockers. For example, the multi-receiver control and interference detection logic 50 may select a test procedure to determine the source or sources of the interference problem by eliminating each of the above possibilities until one or more sources of interference are found. Accordingly, the multi-receiver control and interference detection logic 50 may first test to see if a first order harmonic interference signal is causing the degradation in the wireless signal 80, for example, by determining if an interference signal is present in a channel occupied by the wireless signal 80. According to this embodiment, the multi-receiver control and interference detection logic 50 may detect the signal strength of a co-channel interference signal and determine if the co-channel interference signal is sufficiently strong to be a possible cause of interference, and therefore a cause for the degradation detected in the wireless signal 80.

As shown in Step 230, the multi-receiver control and interference detection logic 50 simultaneously controls the second receiver 30 to detect an interference blocker signal 100 while the first receiver 20 receives at least portions of the wireless signal 80 and the interference product signal 90 if the first receiver 20 detects a quality metric associated with the received wireless signal that exceeds a threshold. According to one embodiment, the multi-receiver control and interference detection logic 50 may provide an interference blocker search signal 110 to the second receiver 30 to detect a second interference blocker signal. For example, the second interference blocker signal may combine with a first interference blocker signal previously found in amplifier 60, which causes the generation of a third-order harmonic interference product signal or a cross-mode modulation interference product signal, resulting in the interference product signal 90 as previously discussed. If the second receiver 30 provides interference blocker data 120 that indicates to the multi-receiver control and interference detection logic 50 that a second interference blocker signal exists causing interference product signal 90, then multi-receiver control and interference detection logic 50 may adjust at least one of a first and a second operating condition of the first receiver 20 and of the amplifier 60 in order to mitigate the effect of the resulting interference product signal 90.

Although the first receiver 20 is described as receiving the wireless signal 80 and the interference product signal 90 while the second receiver 30 is used to search for and detect the interference blocker signal 100, the second receiver 30 may receive the wireless signal 80 and the interference product signal 90 while the first receiver 20 searches for and detects the interference blocker signal 100. Additionally, the number of receivers is not limited to two but may be any suitable number. Further, any combination of receivers may, for example, receive the wireless signal 80 and the interference product signal 90, while any number of receivers may search for the detected interference blocker signal 100. According to one embodiment, the second receiver 30 searches or scans a band of frequencies to locate and detect the interference blocker signal 100 in order to determine if the interference product signal 90 is a result of third order harmonic interference such as that generated by cross modulation or cross mode cross modulation as previously described.

The multi-receiver control and interference detection logic 50 may select a test procedure to control the second receiver 30 to detect a signal level at a frequency located in at least a portion of a frequency band by, for example, searching the frequency band and tuning to and scanning for an identified potential blocker frequency signal. Accordingly, the portion of the frequency band is eliminated as including the interference blocker signal 100 if the detected signal level is below a threshold level. The threshold level may be determined based on knowledge of a minimum required signal level necessary to, for example, generate a third order harmonic signal within amplifier 60 such as a low noise amplifier (LNA). Similarly, the portion of the frequency band may be determined to include the interference blocker signal 100 if the detected signal level is above the threshold level. Accordingly, the candidate interference blocker signals may be ruled out as being possible interference blocker signals by a process of elimination. For example, the multi-receiver control and interference detection logic 50 may cause second receiver 30 to search a band of frequencies by, for example, dividing up the band of frequencies into subbands and searching each subband to determine if an interference blocker signal 100 exists in any of these sub-bands. The subbands may be determined based on any known search algorithm such as the halving method, a geometric progression or any suitable search algorithm.

The cause or source of co-channel interference and the effect co-channel interference has on the degradation of wireless signal 80 is known in the art. Therefore, based on a signal strength measurement of the co-channel, an adjacent channel, and of other candidate channels previously calculated, the multi-receiver control and interference detection logic 50 may determine if co-channel interference exists, and, if not, then co-channel interference may be eliminated as a likely source of interference. For example, the multi-receiver control and interference detection logic 50 may test for interference caused by third order harmonics based on the knowledge of the frequency of the received channel utilized by wireless signal 80 and by, for example, knowledge of a transmit signal such as a W-CDMA transmit signal that is paired with the received wireless communication signal 80 in order to provide communication.

As shown in Step 240, the multi-receiver control and interference detection logic 50 adjusts at least one operating condition of the first receiver 20 to reduce the interference product signal 90 received by the first receiver 20 in order to improve the quality metric associated with the wireless signal 80. Once the multi-receiver control and interference detection logic 50 has determined the interference blocker signal 100 or signals based on, for example, the process of elimination described above, the multi-receiver control and interference detection logic 50 may then decide on the appropriate form of interference mitigation. For example, the multi-receiver control and interference detection logic 50 provides a mitigation control signal 102 to the first receiver 20 and to the amplifier 60 to mitigate the effects of the interference product signal.

According to one embodiment, the multi-receiver control and interference detection logic 50 may adjust a gain of amplifier 60 in order to reduce the interference product signal 90. If, for example, the gain of the amplifier 60 is above a certain level under certain conditions, then the level of the detected interference blocker signal 100 may be reduced by reducing the gain of amplifier 60. Additionally, the linearity of the amplifier 60 may be improved in order to reduce the generation of third order harmonics within amplifier 60. For example, the linearity of amplifier 60 may be improved by raising a collector or drain current of a transistor within amplifier 60 as is well known in the art. If, however, the linearity of the amplifier 60 is increased and yet the degradation to wireless signal 80 persists, then an alternative adjustment to amplifier 60 may be made, such as adjusting the bandwidth of amplifier 60. For example, the bandwidth of amplifier 60 may be adjusted by adjusting a bandwidth of a filter included in amplifier 60.

Similarly, the multi-receiver control and interference detection logic 50 may adjust a gain of first receiver 20 in order to reduce the interference product signal 90 through, for example, reducing the gain of the first receiver 20. Additionally, the linearity of first receiver 20 may also be adjusted through, for example, adjusting a linearity of an amplifier within first receiver 20. Further yet, a bandwidth of first receiver 20 may be adjusted by, for example, adjusting a bandwidth or rejection of a filter within first receiver 20 in order to, for example, filter out the effects of an interference blocker signal 100 such as a co-channel interference blocker signal 100.

The first receiver 20 may be divided into one or more sections such as, for example, a radio frequency section, any intermediate frequency section, and a baseband section as is known in the art. Accordingly, operating conditions of the first receiver 20 may also be similarly classified as, for example, a radio frequency operating condition, an intermediate frequency operating condition, and a baseband operating condition. For example, a radio frequency operating condition may include a front end amplifier within first receiver 20 and, for example, a front end filter. An intermediate frequency operating condition may include, for example, an intermediate frequency filter for filtering out the known generation of third order harmonics within a mixer for producing an intermediate frequency signal. Finally, a baseband operating condition may represent, for example, the filtering of a baseband signal by a baseband filter.

Accordingly, the operating conditions at any stage of the first receiver 20 may be adjusted and include, but are not limited to, adjusting a gain, a linearity and a bandwidth or rejection of the radio frequency operating condition, the intermediate frequency operating condition and the baseband operating condition of first receiver 20.

According to another embodiment, the multi-receiver control and interference detection logic 50 may select from one of multiple interference mitigation solutions by selecting an operating condition of the first receiver 20 or of amplifier 60 such that the degradation to the wireless signal 80 is reduced or eliminated based on a selection of the interference mitigation solution that impacts the power consumption of the first receiver 20 in order to provide the lowest possible power consumption to the receiver. Accordingly, the multi-receiver control and interference detection logic 50 selects the operating condition of the first receiver 20 and of the amplifier 60 that results in lower power consumption for the wireless receiver circuit 10 as opposed to selecting an operating condition of the first receiver 20 that would result in a higher power consumption than would one of the other mitigation solution options.

Once the multi-receiver control and interference detection logic 50 has implemented a mitigation interference solution, as verified in the improvement of the quality metric associated with the wireless signal 80, the mitigation interference technique may be applied for as long as necessary. However, if the interference mitigation solution implemented increases power consumption due to, for example, increasing the linearity of amplifier 60, then the interference mitigation solution may be removed once the second receiver 30 determines that the interference blocker signal 100 is no longer detected. Accordingly, power consumption may be minimized by removing the interference mitigation solution as previously implemented by removing the adjustment of the operating condition as soon as the second receiver 30 no longer detects the interference blocker signal 100.

According to another embodiment, the multi-receiver control and interference detection logic 50 may select from one of multiple interference mitigation solutions by selecting an operating condition of the first receiver 20 or of amplifier 60 such that the degradation to the wireless signal 80 is reduced or eliminated based on a selection of the interference mitigation solution that impacts the distortion of the wireless signal 80 in order to provide the lowest possible distortion of the signal. Accordingly, the multi-receiver control and interference detection logic 50 selects the operating condition of the first receiver 20 and of the amplifier 60 that results in lower distortion for the wireless receiver circuit 10 as opposed to selecting an operating condition of the first receiver 20 that would result in a higher distortion than would one of the other mitigation solution options.

Once the multi-receiver control and interference detection logic 50 has implemented a mitigation interference solution, as verified in the improvement of the quality metric associated with the wireless signal 80, the mitigation interference technique may be applied for as long as necessary. However, if the interference mitigation solution implemented increases distortion due to, for example, decreasing bandwidth of first receiver 20, then the interference mitigation solution may be removed once the second receiver 30 determines that the interference blocker signal 100 is no longer detected. Accordingly, distortion may be minimized by removing the interference mitigation solution as previously implemented by removing the adjustment of the operating condition as soon as the second receiver 30 no longer detects the interference blocker signal 100.

Figure 3:
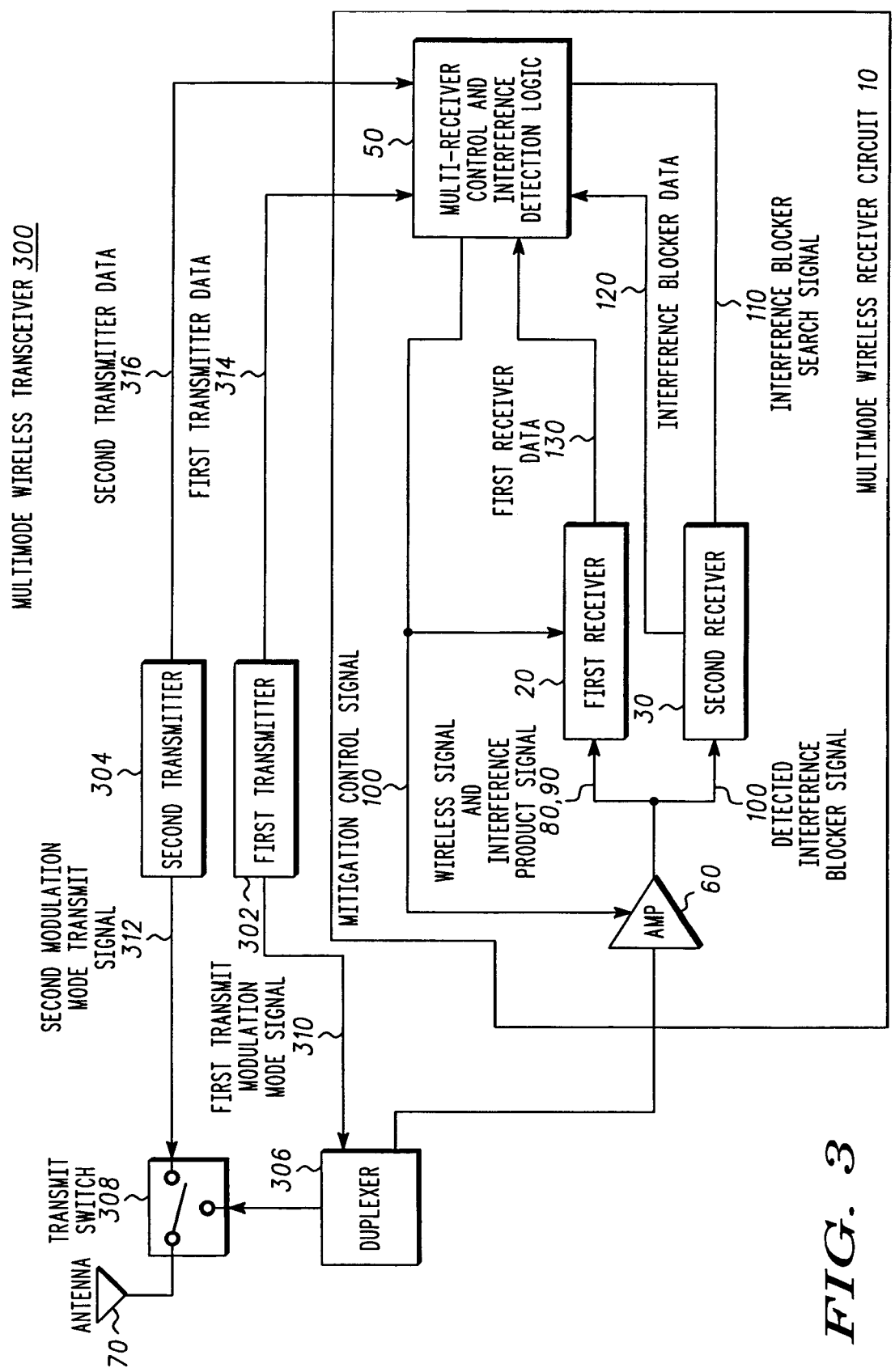
FIG. 3 is a block diagram illustrating an exemplary wireless transceiver according to another embodiment of the invention.

FIG. 3 is a block diagram of a multimode wireless transceiver 300 including the multimode wireless receiver circuit 10 as previously described, and also including a first transmitter 302, a second transmitter 304, a duplexer 306 and a transmit switch 308. First transmitter 302 is coupled to the antenna 70 via the duplexer 306 to transmit a first modulation mode transmit signal 310. The second transmitter 304 may be coupled to the antenna 70 via the transmit switch 308 to transmit a second modulation mode transmit signal 312. The transmit switch 308 may permit either the first modulation mode transmit signal 310 or the second modulation mode transmit signal 312 to transmit on antenna 70 depending on, for example, the modulation mode required. First transmitter 302 may provide the first transmitter data 314 to the multi-receiver control and interference detection logic 50 in order to provide information, such as, for example, the current transmit frequency of the first modulation mode transmit signal 310 and the transmit power level for first transmitter 302. Similarly, the second transmitter 304 may provide the second transmitter data 316 to the multi-receiver control and interference detection logic 50 in order to provide information, such as, for example, the current transmit frequency of the second modulation mode transmit signal 312 and the transmit power level for second transmitter 304.

According to this embodiment, wireless device 300 may, for example, permit communication while in a W-CDMA mode where first transmitter 302 produces a first modulation mode transmitter signal 310 such as a W-CDMA transmit signal and first receiver 20 receives the wireless signal 80 such as the W-CDMA transmit signal. According to this embodiment a co-band W-CDMA and GSM system may allow wireless transceiver 300 to communicate with a W-CDMA system via, for example, a W-CDMA base station. However, as previously described with respect to the W-CDMA and GSM co-band system, the GSM base station signal may manifest itself as a detected interference blocker signal 100. The combination of the detected interference blocker signal 100 and the presence of the first modulation mode transmit signal 310, albeit attenuated by the duplexer 306 when received by amplifier 60, may cause the generation of a third order harmonic signal, resulting in an interference product signal 90 such as a cross mode cross modulation signal. Accordingly, multi-receiver control and interference detection logic 50 may utilize second receiver 30 to tune second receiver 30 to the known GSM transmit frequencies in order to determine if the interference product signal 90 is caused by the mixing of the locally generated first modulation mode transmit signal 310 and the detected interference blocker signal 100 here represented as a GSM signal.

Among other advantages, the present invention allows the wireless receiver circuit 10 to adapt dynamically to the presence of an interference product signal 90 causing a degradation in quality to the received wireless signal 80. This is accomplished by simultaneously receiving the wireless signal 80 and the interference product signal 90 while controlling the second receiver 30 to detect the interference blocker signal 100. This will allow the multimode wireless transceiver 300 to operate simultaneously in two different modulation modes without causing a degradation of performance while communicating in either modulation mode. The multimode wireless receiver circuit 10 may therefore fulfill a multimode role in order to overcome conflicting design requirements, such as transmitting and receiving a W-CDMA signal while simultaneously receiving a GSM signal in the presence of interferers. The wireless receiver circuit 10 may, therefore, employ the multi-receiver control and interference detection logic 50 to dynamically identify the sources of interference and to adjust at least one operating condition of the amplifier 60 and the first receiver 20 in order to mitigate the effects of the detected interference blocker signal 100.

It should be understood that the implementation of other variations and modifications of the invention and its various aspects will be apparent to those of ordinary skill in the art and that the invention is not limited by the specific embodiments described. For example, the wireless transceiver 300 may have more than two receivers and/or transmitters that use more than two different radio access technologies. The wireless transceiver 300 may have multiple receivers and/or transmitters associated with a first radio access technology and one or more receivers and/or transmitters associated with a second radio access technology. The wireless transceiver 300 may have elements other than those shown in FIGS. 1 and 3. The multiple receivers having different radio access technologies may be utilized to simultaneously receive signals while receiving detected interference blocker signals 100 by one or more receivers in order to identify a degradation in the wireless signal 80 as a result of the detected interference blocker signal 100. Further, any combination of interference mitigation techniques described may be activated. It is, therefore, contemplated to cover the present modifications, variations or equivalent that fall within the spirit and scope of the basic underlying principles disclosed and claimed herein.

What is claimed is:

1. A wireless receiver circuit comprising:
    a first receiver operative to receive a wireless signal and an interference product signal;
    a second receiver operative to detect an interference blocker signal associated with the interference product signal; and
    multi-receiver control and interference detection logic, operatively coupled to the first and second receivers to simultaneously control the second receiver to detect the interference blocker signal while the first receiver receives at least a portion of the wireless signal and the interference product signal,
    wherein in response to the interference blocker signal detected by the second receiver, the second receiver provides interference blocker data to the multi-receiver control and interference detection logic, and wherein in response to the interference blocker data provided to the multi-receiver control and interference detection logic by the second receiver, the multi-receiver control and interference detection logic adjusts at least one operating condition of the first receiver such that the interference product signal received by the first receiver is reduced.

2. The wireless receiver circuit of claim 1, further including:
    an amplifier, operatively coupled to the first receiver and to the second receiver to provide the wireless signal and the interference product signal to the first receiver, and to provide the interference blocker signal to the second receiver, and wherein in response to an interference blocker search signal provided to the second receiver by the multi-receiver control and interference detection logic and also in response to the interference blocker signal detected by the second receiver and the interference blocker data provided to the multi-receiver control and interference detection logic by the second receiver, the multi-receiver control and interference detection logic is also operatively coupled to the amplifier to provide a mitigation control signal to adjust at least one operating condition of the amplifier and of the first receiver.

3. The wireless receiver circuit of claim 1, wherein the multi-receiver control and interference detection logic is operative to provide an interference blocker search signal to control the second receiver to detect a second interference blocker signal, and in response, the multi-receiver control and interference detection logic provides a mitigation control signal to the first receiver to adjust at least one of a first and a second operating condition of the first receiver to reduce the interference product signal received by the first receiver.

4. The wireless receiver circuit of claim 1, wherein the first receiver is operative to provide to the multi-receiver control and interference detection logic, first receiver data corresponding to a signal quality metric associated with the wireless signal, wherein if the signal quality metric detected by the first receiver exceeds a threshold, the multi-receiver control and interference detection logic provides an interference blocker search signal to direct the second receiver to search a frequency band and to detect the interference blocker signal within the frequency band.

5. The wireless receiver circuit of claim 1, wherein the multi-receiver control and interference detection logic is operative to control the second receiver to detect a signal level at a frequency located in at least a portion of a frequency band by at least one of searching the frequency band and tuning to a candidate blocker frequency, such that the portion of the frequency band is eliminated as including the interference blocker signal if the detected signal level is below a threshold level, and the portion of the frequency band includes the interference blocker signal if the detected signal level is above the threshold level.

6. The wireless receiver circuit of claim 1, wherein the at least one operating condition of the first receiver is at least one of a radio frequency operating condition, an intermediate frequency operating condition and a baseband operating condition.

7. The wireless receiver circuit of claim 1, wherein if the second receiver ceases to detect the interference blocker signal, the second receiver provides corresponding interference blocker data to the multi-receiver control and interference detection logic and in response, the multi-receiver control and interference detection logic is operative to provide a corresponding mitigation control signal to the first receiver to remove the adjustment of the at least one operating condition of the first receiver.

8. The wireless receiver circuit of claim 1, wherein the multi-receiver control and interference detection logic is operative to provide an interference blocker search signal to adjust the at least one operating condition of the first receiver in response to at least one of a transmit power level, a transmitter activation indication, a transmit and receive channel assignment, a receive signal strength level of the wireless signal, a quality level associated with the wireless signal, a receive signal strength level of the interference blocker signal, a bandwidth of an operating band, a channel spacing, a list of internal receiver harmonic interference signals, a receiver selectivity and a receiver sensitivity.

9. The wireless receiver circuit of claim 1, wherein in response to the interference blocker signal detected by the second receiver and the interference blocker data provided to the multi-receiver control and interference detection logic by the second receiver, the multi-receiver control and interference detection logic provides a mitigation control signal to the first receiver to select at least one operating condition of the first receiver such that the selected at least one operating condition of the first receiver results in lower power consumption for the first receiver than a non-selected operating condition of the first receiver.

10. The wireless receiver circuit of claim 1, wherein in response to the interference blocker signal detected by the second receiver and the interference blocker data provided to the multi-receiver control and interference detection logic by the second receiver, the multi-receiver control and interference detection logic provides a mitigation control signal to the first receiver to select at least one operating condition of the first receiver such that a distortion level associated with the wireless signal received by the first receiver is reduced.

11. The wireless receiver circuit of claim 1 wherein the first receiver is adapted to receive signals associated with a first radio access technology, and wherein the second receiver is adapted to receive signals associated with a different and second radio access technology.

12. A wireless device comprising:
a wireless receiver circuit comprising:
an amplifier operative to receive a first modulation mode wireless signal, an interference product signal and an interference blocker signal;
a first modulation mode receiver operatively coupled to the amplifier to receive the first modulation mode wireless signal and the interference product signal;
a second modulation mode receiver operatively coupled to the amplifier to detect the interference blocker signal; and
multi-receiver control and interference detection logic, operatively coupled to the first modulation mode receiver and to the second modulation mode receiver to simultaneously control the second modulation mode receiver to detect the interference blocker signal while the first modulation mode receiver receives at least a portion of the wireless signal and the interference product signal,
wherein in response to the interference blocker signal detected by the second receiver, the second receiver provides interference blocker data to the multi-receiver control and interference detection logic, and wherein in response to the interference blocker data provided to the multi-receiver control and interference detection logic by the second receiver, the multi-receiver control and interference detection logic adjusts at least one operating condition of the amplifier and of the first receiver such that the interference product signal received by the first receiver is reduced.

13. The wireless device of claim 12, wherein in response to the interference product signal detected by the first receiver, the first receiver provides first receiver data to the multi-receiver control and interference detection logic and, the multi-receiver control and interference detection logic provides an interference blocker search signal to the second modulation mode receiver to detect at least one interference blocker signal, wherein in response to the interference blocker data, the multi-receiver interface control and interference detection logic provides a mitigation control signal to the amplifier, and in response to the mitigation control signal, the amplifier adjusts at least one of a gain of the amplifier, a linearity of the amplifier and a bandwidth of the amplifier.

14. The wireless device of claim 12, wherein in response to the interference product signal detected by the first receiver, the first receiver provides first receiver data to the multi-receiver control and interference detection logic, and the multi-receiver control and interference detection logic provides an interference blocker search signal to the second modulation mode receiver to detect at least one interference blocker signal, wherein in response to the interference blocker data, the multi-receiver interface control and interference detection logic provides a mitigation control signal to at least one of the amplifier and the first receiver, wherein in response to the mitigation control signal:
the amplifier adjusts at least one of a gain of the amplifier, a linearity of the amplifier, a bandwidth of the amplifier, and the rejection of the amplifier and
the first modulation mode receiver adjusts at least one of a gain of the receiver, a linearity of the receiver, a bandwidth of the receiver, and the rejection of the receiver.

15. The wireless device of claim 12, wherein the multi-receiver control and interference detection logic is operative to provide an interference blocker search signal to control the second receiver to detect a signal level at a frequency located in at least a portion of a frequency band by at least one of searching the frequency band and tuning to a candidate blocker frequency, such that the portion of the frequency band is eliminated as including the interference blocker signal if the detected signal level is below a threshold level, and the portion of the frequency band includes the interference blocker signal if the detected signal level is above the threshold level.

16. The wireless device of claim 12 further comprising:
an antenna operatively coupled to the amplifier to provide the first modulation mode wireless signal, the interference product signal and the interference blocker signal;
a first transmitter operatively coupled to the antenna to transmit a first modulation mode transmit signal and operatively coupled to provide first transmitter data including at least one of channel data, power level data, and frequency data to the multi-receiver control and interference detection logic; and
a second transmitter operatively coupled to the antenna to transmit a second modulation mode transmit signal and operatively coupled to provide second transmitter data including at least one of channel data, power level data, and frequency data to the multi-receiver control and interference detection logic.

17. A method for reducing signal interference in a wireless receiver circuit, the method comprising the steps of:
receiving a wireless signal and an interference product signal by a first receiver;
simultaneously controlling a second receiver to detect an interference blocker signal while the first receiver receives at least portions of the wireless signal and the interference product signal, if the first receiver detects a quality metric associated with the received wireless signal that exceeds a threshold; and
adjusting at least one operating condition of the first receiver to reduce the interference product signal received by the first receiver, based on the second receiver detecting the interference blocker signal.

18. The method of claim 17 further including:
detecting a second interference blocker signal by the second receiver and, in response, receiving interference blocker data from the second receiver; and adjusting at least one of a first and a second operating condition of the first receiver in response to detecting the second interference blocker signal.

19. The method of claim 17 further including:
receiving a signal level by the second receiver at a frequency located in at least a portion of a frequency band, wherein the portion of the frequency band is eliminated as including the interference blocker signal if the detected signal level is below a threshold level, and the portion of the frequency band includes the interference blocker signal if the detected signal level is above a threshold level.

20. The method of claim 17 wherein at least one operating condition of the first receiver is at least one of a radio frequency operating condition, an intermediate frequency operating condition and a baseband operating condition.

21. The method of claim 17, wherein if the second receiver no longer detects the interference blocker signal, removing the adjustment of the at least one operating condition.

22. The method of claim 17, wherein adjusting the at least one operating condition of the first receiver is in response to the second receiver detecting the interference blocker signal and, in response to receiving at least one of a transmit power level, a transmitter activation indication, transmit and receive a channel assignment, a receive signal strength level of the wireless signal, a quality level associated with the wireless signal, a receive signal strength level of the interference blocker signal, a bandwidth of an operating channel, a channel spacing, a list of internal receiver harmonic interference signals, a receiver selectivity and a receiver sensitivity.

23. The method of claim 17 including selecting the at least one operating condition of the first receiver in response to the detected interference blocker signal such that the selected at least one operating condition of the first receiver results in lower power consumption for the first receiver than would a non-selected operating condition of the first receiver.

24. The method of claim 17 wherein adjusting the at least one operating condition of the first receiver to reduce the received interference product signal based on the second receiver detecting the interference blocker signal includes:
receiving interference blocker data from the second receiver based on the second receiver detecting the interference blocker signal; and
providing a mitigation control signal to the first receiver to reduce the received interference product signal based on the second receiver detecting the interference blocker signal.

25. A memory containing instructions executable by one or more processing devices that causes the one or more processing devices to:
receive a wireless signal and an interference product signal by a first receiver;
simultaneously control a second receiver to detect an interference blocker signal while the first receiver receives at least portions of the wireless signal and the interference product signal, if the first receiver detects a quality metric associated with the received wireless signal that exceeds a threshold; and
adjust at least one operating condition of the first receiver to reduce the interference product signal received by the first receiver, based on the second receiver detecting the interference blocker signal.

26. The memory of claim 25 containing executable instructions that cause the one more processing devices to:
detect a second interference blocker signal by the second receiver and, in response, receive interference blocker data from the second receiver; and
adjust at least one of a first and a second operating condition of the first receiver in response to detecting the second interference blocker signal.

* * * * *